Patented Aug. 28, 1945

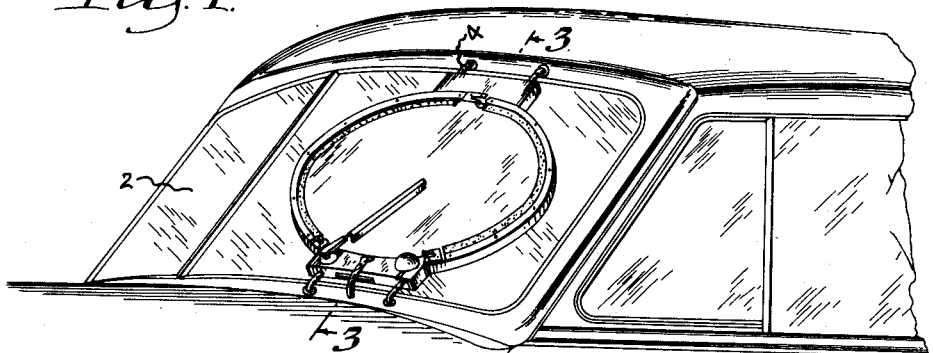

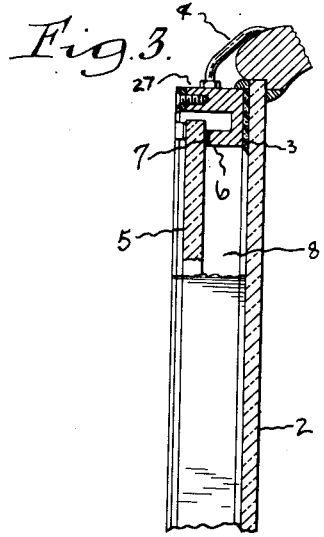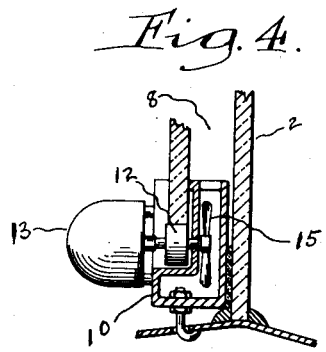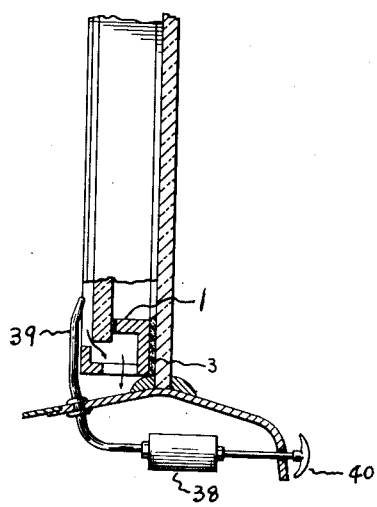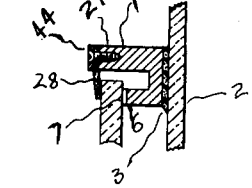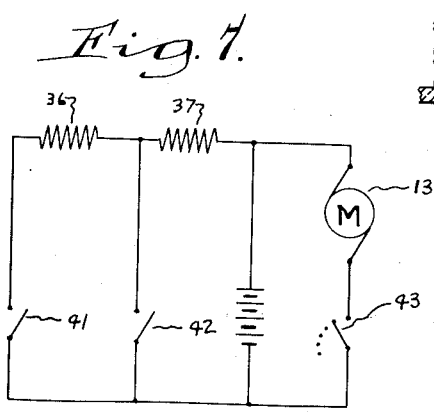

2,383,750

UNITED STATES PATENT OFFICE 2,383,750

WINDSHIELD CLEANER

Saul S. Smith, Buffalo, N. Y.

Application February 11, 1943, Serial No. 475,505

7 Claims. (Cl. 20—40.5)

This invention relates to improvements in windshield cleaners and more particularly to the rotatable type which is disposed adjacent the front of the windshield directly in front of the driver for the purpose of removing rain, snow, sleet, ice, etc., whereby the vision of the operator will not be obscured. It is old in this art to provide a rotatable window which revolves on a center axle with either a frame or some other means to support the center element. Such center devices naturally hinder the driver from having a clear view ahead and it is an object of this invention to provide a circular transparent disc which is rotatably supported at its periphery and will tend to remove visual obscuring material from its surface by centrifugal force and when necessary a wiper blade is manually positioned against the rotating surface to assist in removing any atmospheric material outward.

Another object of this invention is to provide a bearing surface against which the rotating disc is marginally held spring pressed to effect a substantial dead air space in the annular frame between the windshield and the rotating disc.

Another object is to heat the dead air space and when the transparent circular disc is rotating to provide fans to circulate the heated air thereby causing clear view vision when the climatic conditions are such as to product mist, dew, fog, ice, etc., on the windshield of a vehicle and to loose all freezing material on the face of the disc and also free all moving parts of the device.

A still further object is to provide a marginal encasement on the oustide surface of the rotating disc to prevent rain water etc. from entering behind the transparency.

Another purpose is to provide a rotatable window windshield cleaner which is simple in construction, strong, durable, and well adapted for the purpose it is designed that can be readily and easily installed for use.

Other objects of the invention will more fully appear from the following description and the accompanying drawings and will be pointed out in the annexed claims.

A structure has been disclosed in the drawings to carry out the objects of the invention but it is understood that the invention is not confined to the exact features shown as various changes may be made within the scope of the claims which follow.

Figure 1 is a perspective view of a fragment of an automobile illustrating the application.

Figure 2 is a front elevation of the device with the upper and lower portions broken away.

Figure 3 is a fragmentary sectional elevation of the device on line 3—3 of Figure 1 as mounted on a windshield.

Figure 4 is a detail sectional view of the motor and driven elements on line 4—4 of Figure 2.

Figure 5 is a sectional view taken on a line 5—5 of Figure 2.

Figure 6 is a sectional view taken on line 6—6 of Figure 2.

Figure 7 is an electrical schematic layout of wiring for motor and heating units.

The novel device featured in this invention comprises a metal frame designated by the numeral 1 Figure 2, ring shaped, with flat-sided extensions or compartments projecting outwardly from the top and bottom thereof. The back of the frame in its entirety is flat and adapted to be fastened to the windshield of an automobile 2, Figure 1, on a gasket 3, Figure 3. Anchor bolts 4 have hooks on one end which enter holes in the frame of the windshield and hold frame 1 tightly against the windshield.

A circular transparent disc 5 made of preferably an unbreakable plastic material covers the central opening of the frame 1. Disc 5 overlaps the complete ring 6 Figure 5 which is the inner U shaped portion of frame 1. Ring 6 has a smooth ground surface 7 upon which the disc 5 rotates slidingly.

The bearing surface formed by surface of ring 6 and the disc 5 seals the inner air space created by windshield 2, frame 1, and the disc 5 against any entry of water or escape of air thus making a substantial dead air space 8, Figures 3 and 4.

On the bottom of frame 1 and at its right in the extension thereof is an offset portion 10, shown in Figure 4, to receive the roller 12, the outer surface of which is preferably made of rubber. An electric motor 13 causes roller 12 and propeller 15 to rotate. Roller 12 carries the disc 5 against its surface and rotates disc 5 by friction.

The left side of the frame extension 9 has an offset portion 16 therein similar to the frame portion 10 to receive the free rotating roller 18 which is also preferably of rubber and is free to rotate on axle 19. Propeller 14 is attached to axle 19. The roller 18 turns by friction of disc 5 against its surface. Rollers 12 and 18 form a cradle effect and receive pressure from the disc because of its weight and also from spring pressed rollers 20 and 21 which are located in the upper extension of the frame 1. The springs 23 and 24 are riveted in the frame at 25 and 26 and have axles in the other end which hold rubber rollers 20 and 21 spring pressed against disc 5.

The U shaped part of frame 1 has a raised portion on its outside 27, Figures 3 and 5. Upon the flat portion of this outer ring a circular thin rubber 28 is held clamped by a circular flat metal 44. Rubber 28 extends over the surface of disc 5 and lies lightly on its surface.

On the surface of ring 27 on the lower portion of the frame two springs 29 and 30 are held thereto by screws. Also on top of the frame another spring 31 is held in a similar way. All three springs press lightly against disc 5 to hold the disc against bearing surface 7 of the frame.

Upon the axle of roller 19 and on the outside of the frame a windshield wiper 32 is held free to move to the center of the disc or to its lower out of the way position by stop 33 on plunger 35, which is manually manipulated, within the bracket 34.

To spray the surface of the disc with a cleaning fluid a pump 38 with tube extension 39 is provided to spray the surface of disc 5 by manually pushing plunger 40 from inside the vehicle.

Individual switches 41 and 42, shown in Figure 7, control the current to heating elements 36 and 37 on the underside of frame portion 9 and 10 in the dead air space 8. Motor 13 has a variable speed switch 43 in its circuit to vary the speed of the rotation of the circular disc in its clockwise direction.

When the operator of a vehicle wishes to use this device because of sleet, ice or any other material on the windshield, one or both heating elements are caused to heat the dead air space by closing the switches provided for that purpose. The variable switch controlling the motor circuit is closed and the disc is rotated at a suitable speed. Some of the material on the rotating disc is cleared away by centrifugal force. The wiper blade is then put into position and the disc rotating against the blade clears the remaining sleet, ice, etc. which has been melted or softened by the heated air. The surface of the disc is sprayed by a liquid at any time required by operating the plunger which will chemically treat most particles so they can be removed.

I claim as my invention:

1. A device of the class described, comprising, in combination with a windshield, a circular frame mounted thereon in overlying relation thereto, a transparent disc rotatably mounted within said frame in facial air-sealed relation thereto and in spaced relation to the windshield for creating a dead air space, means on said frame for supporting the disc at its periphery and for rotating the same, and a heating element arranged within the frame and in communicating relation with the dead air space, whereby ice, sleet and snow will be melted on the outside of the disc and be removed by the rotation of the disc and the formation of moisture and condensation on the inside will be prevented by the heated dead air space.

2. A device of the class described, comprising, in combination with a windshield, a ring-like frame mounted thereon in overlying relation thereto, a transparent disc rotatably mounted within said frame in facial air-sealed relation thereto and in spaced relation to the windshield for creating a dead air space, said frame having a compartment projecting outwardly therefrom, a heating element arranged within said frame-compartment, a driving element in said compartment and in peripheral engagement with the disc for rotating it, and a fan in communicating relation with said space and operatively connected to said driving element whereby heat will be circulated throughout the dead air space by the rotation of the fan.

3. In an attachment for windshields, a ring-like frame adapted to be mounted in overlying relation to the windshield and having an annular, outwardly-facing bearing surface thereon, a transparent disc rotatably mounted within said frame in spaced relation to the windshield and in marginal facial engagement at its inner face with said frame-bearing surface, a heating element arranged within the frame in heat-transmitting relation to the air space between the windshield and the rotating disc, a driving element in peripheral motion-transmitting relation with the disc, and a fan attached to said driving element and disposed to circulate the heated air in the air space.

4. A device of the character described, comprising a ring-like frame adapted for attachment to a wind-shield in overlying, flatwise relation thereto and including inner and outer concentric flanges projecting forwardly therefrom, the inner flange terminating at its edge in a bearing face spaced from and parallel to the windshield and the outer flange projecting forwardly beyond and in enclosing relation to said inner flange, a transparent disc rotatably mounted in said frame with its periphery enclosed by said outer frame-flange and with its rear marginal side in bearing contact with the bearing face of said inner flange to provide a closed air space between the disc and the windshield, and a motor mounted on said frame including a driving element in peripheral motion-transmitting relation to said disc.

5. A device of the character described, comprising a ring-like frame adapted for attachment to a wind-shield in overlying, flatwise relation thereto and including inner and outer concentric flanges projecting forwardly therefrom, the inner flange terminating at its edge in a bearing face spaced from and parallel to the windshield and the outer flange projecting forwardly beyond and in enclosing relation to said inner flange, a transparent disc rotatably mounted in said frame with its periphery enclosed by said outer frame-flange and with its rear marginal side in bearing contact with the bearing face of said inner flange to provide a closed air space between the disc and the windshield, rollers mounted in said frame at diametrically opposite sides thereof for supporting engagement with the periphery of said disc, and a motor connected to one of said rollers for transmitting rotary motion to the disc.

6. A device of the character described, comprising a ring-like frame adapted for attachment to a windshield in overlying, flatwise relation thereto and including inner and outer concentric flanges projecting forwardly therefrom, the inner flange terminating at its edge in a bearing face spaced from and parallel to the windshield and the outer flange projecting forwardly beyond and in enclosing relation to said inner flange, a transparent disc rotatably mounted in said frame with its periphery enclosed by said outer frame-flange and with its rear marginal side in bearing contact with the bearing face of said inner flange to provide a closed air space between the disc and the windshield, rollers mounted in said frame at diametrically opposite sides thereof for supporting engagement with the periphery of said disk, a motor connected to one of said rollers for transmitting rotary motion to the disc, a heating element in communicating relation with the air space between the disc and the windshield, and a fan mounted on said motor-driven roller and disposed in such air space for circulating the heated air therein.

7. A device of the character described, comprising a ring-like frame adapted for attachment to a windshield in overlying, flatwise relation thereto and including inner and outer concentric flanges projecting forwardly therefrom, the inner flange terminating at its edge in a bearing face spaced from and parallel to the windshield and the outer flange projecting forwardly beyond and in enclosing relation to said inner flange, a transparent disc rotatably mounted in said frame with its periphery enclosed by said outer frame-flange and with its rear marginal side in bearing contact with the bearing face of said inner flange to provide a closed air space between the disc and the windshield, means mounted on said frame at different spaced points thereof and in bearing engagement with the outer face of the disc for yieldingly urging the same against the bearing face of the inner frame-flange, and a motor mounted on said frame including a driving element in motion-transmitting relation to said disk.

SAUL S. SMITH.